United States Patent [19]

Armstrong

[11] Patent Number: 5,570,094
[45] Date of Patent: Oct. 29, 1996

[54] THREE DIMENSIONAL TRACKING BY ARRAY DOPPLER RADAR

[76] Inventor: Brian S. R. Armstrong, 4107 N. Prospect Ave., Shorewood, Wis. 53211

[21] Appl. No.: 541,413

[22] Filed: Oct. 10, 1995

[51] Int. Cl.$^6$ ........................................ G01S 13/72
[52] U.S. Cl. .................... 342/107; 342/115; 342/140; 342/97
[58] Field of Search ................. 342/90, 97, 95, 342/106, 107, 108, 115, 140, 195

[56] References Cited

U.S. PATENT DOCUMENTS

| | | | |
|---|---|---|---|
| 3,680,124 | 7/1972 | Stone et al. | 342/424 |
| 3,996,590 | 12/1976 | Hammack | 342/465 |
| 4,176,338 | 11/1979 | Spindel et al. | 367/6 |
| 4,287,579 | 9/1981 | Inoue et al. | 367/94 |
| 4,321,601 | 3/1982 | Richman | 342/25 |
| 4,717,916 | 1/1988 | Adams et al. | 342/107 |
| 4,768,034 | 8/1988 | Preikschat et al. | 342/80 |
| 5,150,310 | 9/1992 | Greenspun et al. | 364/516 |
| 5,216,639 | 6/1993 | Ohtsuki et al. | 367/90 |
| 5,249,303 | 9/1993 | Goeken | 455/33.4 |
| 5,442,359 | 8/1995 | Rubin | 342/109 |

*Primary Examiner*—John B. Sotomayor

[57] ABSTRACT

A moving target which is reflecting waves will give rise to the well known Doppler frequency shift. When the reflected signal can be compared with the transmitted signal in homodyne detection, the resulting signal is called the Doppler signal. Both frequency and phase of the Doppler signal carry information about the motion of the target.

By observing a Doppler signal at several points in space, it is possible to determine the position, velocity and acceleration of a moving target. Systems employing this principle are-used to track acoustic emitters with sonar, as well as radio emitters with radar. While the prior an has relied on analyzing the Doppler shift frequency, the present invention introduces a method employing the analysis of the phase of the Doppler signal. The phase-based algorithm shows a better signal to noise ratio in applications where the ratio of velocity and distance to the point of closest approach is large. The improved signal to noise ratio translates to lower power and lower cost for Doppler based three dimensional tracking.

3 Claims, 7 Drawing Sheets

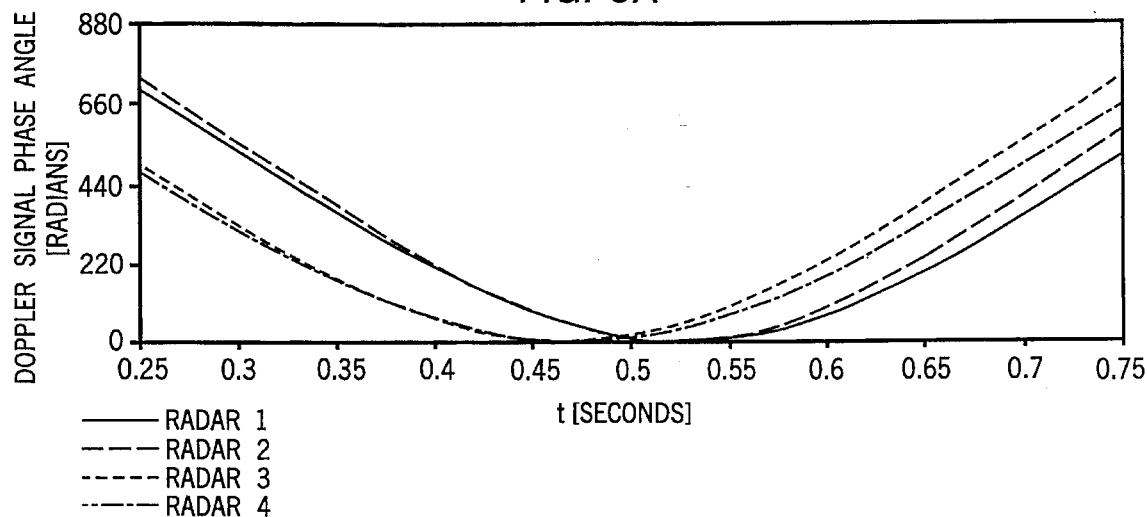
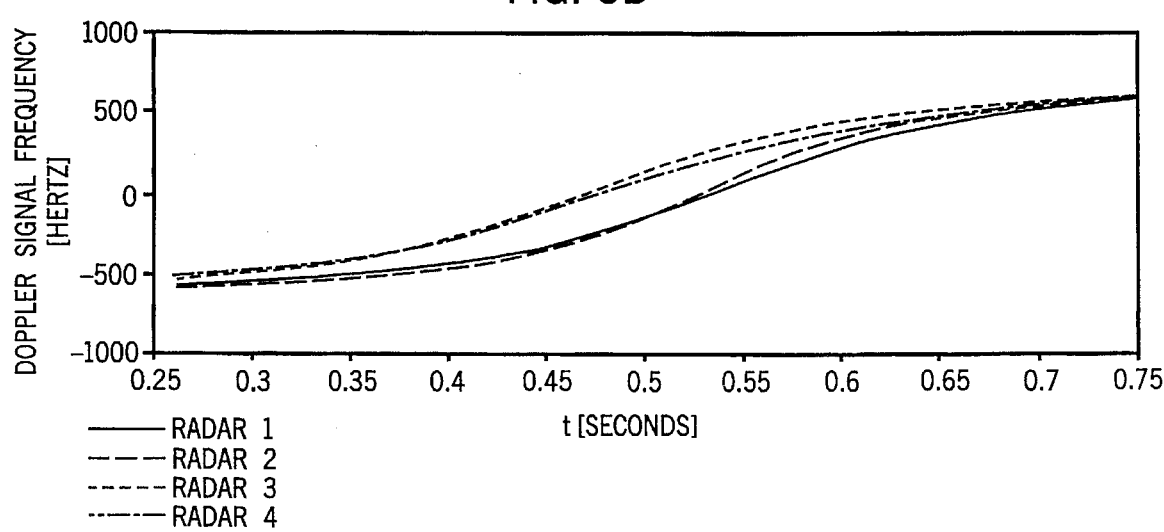

THREE DIMENSIONAL TRACKING BY ARRAY DOPPLER RADAR

BACKGROUND OF THE INVENTION

Standard tracking radar operates with a narrow beam to determine target bearing, and measured time of flight to determine distance. These techniques offer the advantages of direct measurement of target location and high antenna gain; but come with the associated cost of mechanically steered or phased-array antennas and substantial signal processing at the radar frequency. By solving the tracking problem using Doppler signals, with no direct bearing or range information, stationary, wide-beam antennas can be used and the signal processing can be done at the Doppler signal frequency.

The Doppler signal is generated when a moving body reflects waves originating with a transmitter. The reflected waves are received and combined with the transmitted signal in a homodyne detector, as seen in FIG. 1. The distance traveled by the wave is the sum of $R_1(t)$, the distance from transmitter and target, and $R_2(t)$, the distance from target to receiver. As the output of the homodyne detector, the Doppler signal is given by:

$$z_i(t) = A \cos\left(2\pi \frac{R_1(t) + R_2(t)}{\lambda} + \theta_o\right) \quad (1)$$

where A represents the amplitude, which is the consequence of the amplitudes of the transmitted and received signals, and the homodyne detector gain, $\lambda$ is the wavelength of the wave, and $\theta_o$ as the phase delay of the system.

The Doppler frequency shift can be observed with either a transmitter/receiver combination, and as seen in FIG. 1, or a signal which is emitted by the target and a receiver, as is the case for passive Doppler tracking, such as is described by Weinstein and Levanon, in their article "Passive array tracking of a continuous wave transmitting projectile," which was published on page 721 of volume 16, number 5 of the IEEE Transactions on Aerospace and Electronic Systems. Detection of the Doppler signal, however, requires the availability of the transmitted signal for homodyne detection, and thus is infeasible in most passive tracking applications. But when active systems, incorporating both transmitter and receiver, are used, it is straight forward to apply homodyne detection of the Doppler signal. The important advantage is that the Doppler signal includes phase information, which relates to the range to the target, as shown in equation (1).

Tracking using Doppler signals is accomplished by observing the Doppler signal at multiple points in space. An array of sensors and a moving target is illustrated in FIG. 2. The range to the $i^{th}$ sensor is given by:

$$R_i(t) = |X(t) - Xs_i| \quad (2)$$

where $X(t)$ is the target position expressed as a vector in Cartesian coordinates and $Xs_i$ is the location of the $i^{th}$ sensor. When the transmitter and receiver are collocated, as seen in FIG. 3, the distance travelled by the transmitted and received signals are approximately the same, and $R_1(t) \cong R_2(t)$. In this case, the Doppler shift frequency is given by:

$$F_i(t) = \frac{2}{\lambda} \dot{R}_i(t) + \Delta w_i = \frac{2}{\lambda} |\dot{X}(t)| \cos(\phi_i(t)) + \Delta w_i \quad (3)$$

where $\phi_i(t)$ is the angle between the target velocity vector and line of sight to the sensor, as seen in FIG. 2, and $\Delta w_i$ is a frequency shift that may arise if homodyne detection is not used.

For the collocated transmitter and receiver, the Doppler signal is given by:

$$z_i(t) = A_i \cos\left(2\pi \frac{2R_i(t)}{\lambda} + \theta_o\right)$$
$$= A_i \cos\left(2\pi \frac{2|X(t) - Xs_i|}{\lambda} + \theta_o\right) \quad (4)$$

where the amplitude, $A_i$, is a consequence of received and mixer signal amplitudes and filter gain; and where $\theta_o$, is the phase delay of the system.

To illustrate the process of signal generation, the signals arising with a specific motion are seen in FIG. 4. The range between the target and the radar is seen in FIG. 4(A). It reaches its minimum at the point of closest approach. The received signal is seen in FIG. 4(B); in this simplified representation, constant amplitude is shown. The Doppler signal frequency is presented in FIG. 4(C), and is seen to be changing as the target/sensor geometry changes.

Because of the spherical symmetry of the Doppler process, a single sensor is inadequate to determine all of the parameters of a 3D trajectory. But when multiple sensors are used, the signals detected by the several sensors will be slightly different. When 3 or more sensors are used, only one trajectory will in general give rise to the signals detected at all of the sensors. Such a case is seen in FIG. 5, where the phase and frequency signals of 4 radars are presented. As seen in FIG. 5, both the phase and frequency of the Doppler signal show differences between the radars. To analyze the phase angle of the Doppler signal refers to determining the motion of the target based on the detected phase shift between the transmitted and received signals in active Doppler radars at several points in space. Correspondingly, to analyze the frequency of the Doppler signal refers to determining the motion of the target based on the detected Doppler shift frequency. In both cases, it is the differences between signals obtained at different points in space which permits the unique determination of the target motion.

The largest area of application of Doppler-based tracking has been passive tracking of a target which is emitting a sonic or electromagnetic signal. Descriptions of the basic operating principles are given by Chan and Jardine, in their article "Target localization and tracking from Doppler-shift Measurements", which was published on page 163 of volume 8, number 3 of the IEEE Journal of Oceanic Engineering; and by Weinstein and Levanon, in their article "Passive array tracking of a continuous wave transmitting projectile", which was mentioned above.

Recent work has shown that phase-based analysis improves performance in applications where the ratio of velocity at the point of closest approach, $V_{pca}$, and distance to the point of closest approach, $R_{pca}$, is large. The signal to noise ratio is proportional to $\epsilon$, which is given by:

$$\epsilon = \left(\frac{\lambda R_{pca}}{2 V_{pca}}\right) \quad (5)$$

where $\lambda$ is the received signal wavelength. For typical ranges and velocities, $\epsilon$ varies between $10^4$ for sonar applications, such as that described by Chart and Jardine; $10^1$ for the security application described in U.S. Pat. No. 4,236,140; $10^0$ for passive projectile tracking, such as that described by Weinstein and Levanon; $10^{-3}$ for applications to tracking for sports training (e.g., a baseball); and $10^{-4}$ for tracking small arms fire, as described by Colliver and Holcroft, in their article "Radar hostile fire location", which was published on page 32 of the Proceedings of the 1980 IEEE International Radar Conference.

The term ε indicates the ratios of the Cramer-Rao bounds on the signal to noise ratios of phase- and frequency-based 3D tracking. A small value, as for the sports training and small arms fire applications, indicates the use of phase-based tracking. Perhaps because the passive applications in sonar and projectile favor frequency-based tracking, all prior work in 3D tracking with Doppler signals has employed frequency-based methods.

SUMMARY OF THE INVENTION

A moving target may be tracked by observing the Doppler signals at different points in space. An implementation of the present invention would incorporate three or more active Doppler systems, arranged to simultaneously observe the moving target.

Previous approaches to tracking using Doppler signals have focused on the Doppler frequency, which is the preferred approach when: 1) the velocity of the target relative to its distance from the receiver is quite small, or 2) when the signal being received is emitted by the target, and thus accurate phase information is not available.

The current invention implements target tracking using Doppler signal phase. Whereas the Doppler frequency relates to the target's velocity, the Doppler signal phase relates to the target's range. Using a description of the Doppler process, such as is given in equation (4), it is possible compute hypothetical Doppler signals from a description of the target motion. Because the inverse calculation, determining a description of the target motion directly from the Doppler signals, it is not, in general, possible, it is necessary to search the range of possible target motions for the one giving hypothetical Doppler signals which best match the observed Doppler signals. An efficient means of conducting this search is presented in the description of the preferred embodiments, below.

Tracking using Doppler signal phase is preferred when: 1) the velocity of the target relative to its distance from the receiver is large, and 2) when the signal being received is reflected by the target and accurate phase information is available.

BRIEF DESCRIPTION OF THE DRAWING

FIG. 5. Trajectory of FIG. 4, shown on an longer time scale with 4 radars. (A) Doppler signal phase angle (B) Doppler frequency. Radars positioned at the corners of an 0.5 meter square centered in the X-Y plane. The Doppler signal phase angle shows values larger than one complete rotation, corresponding the number of complete cycles observed in the Doppler signal.

DESCRIPTION OF THE PREFERRED EMBODIMENTS

Figure 1:
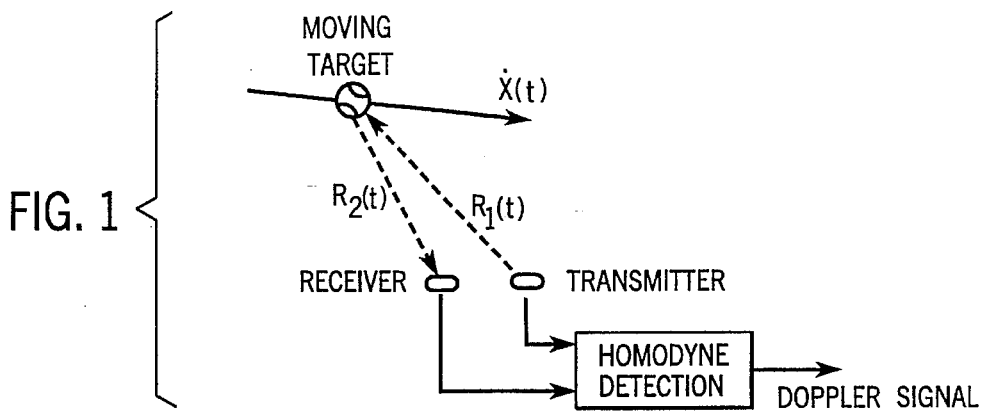
FIG. 1. The generation of a Doppler signal starts with a transmitted wave, which is reflected by the target, and received. The transmitted and received signals are combined in the homodyne detector, which produces the Doppler signal.
Figure 2:
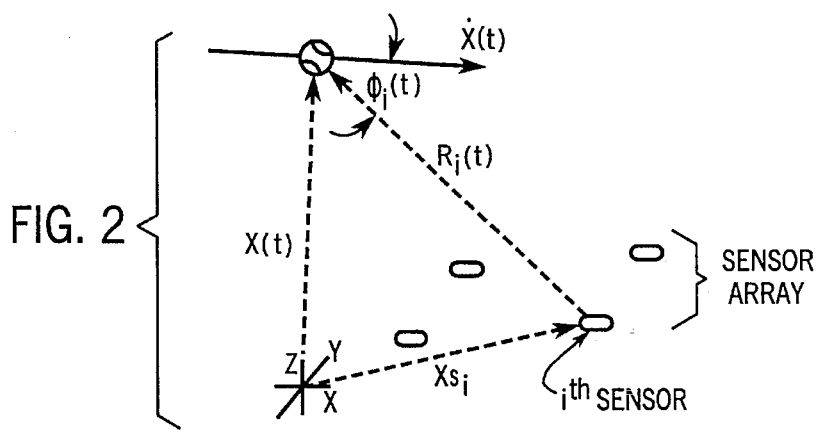
FIG 2. Geometry of a Doppler sensor array with four sensors. $X(t)$ is the position of the target, $\dot{X}(t)$ the velocity, and $Xs_i$ is the location of the $i^{th}$ sensor.
Figure 3:
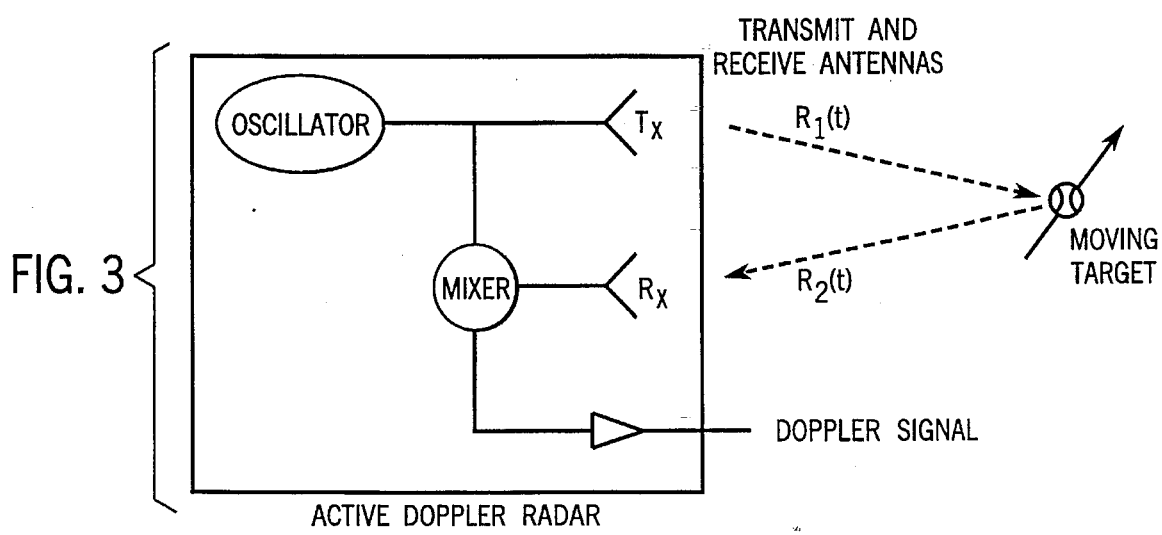
FIG. 3. Basic construction of an active Doppler system. The signal transmitted and received could be acoustic, radio, lasar, or other coherent wave process.
Figure 4A:
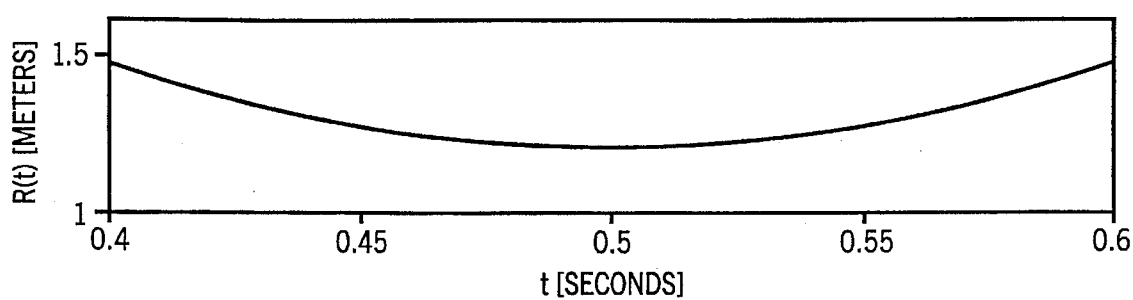
FIG. 4. Simulated data given by the trajectory $X_o=[-4.37, -1.0, 1.225]^T$, $\dot{X}_o=[10, 1, 2]^T$ and $\ddot{X}_o=[-2, 0, -9.81]^T$. (A) Target range, $R_i(t)$; (B) Doppler signal, $z_i(t)$; and (C) Doppler frequency, $F_i(t)$. ($\lambda=2.85$ cm, corresponding to X-band radar, sensor at the origin.)
Figure 4B:
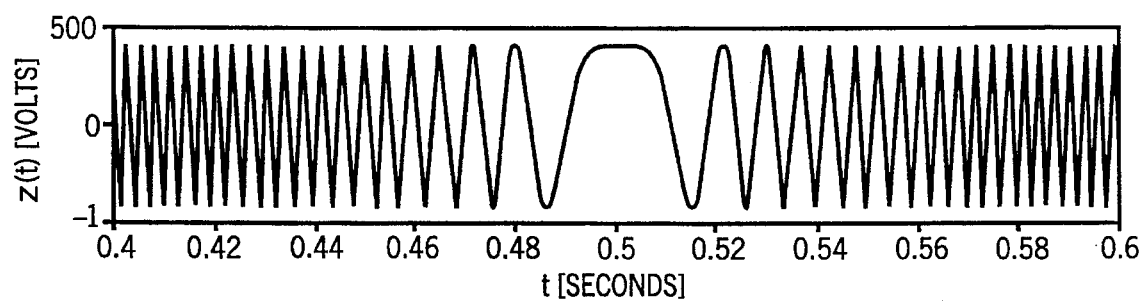
Figure 4C:
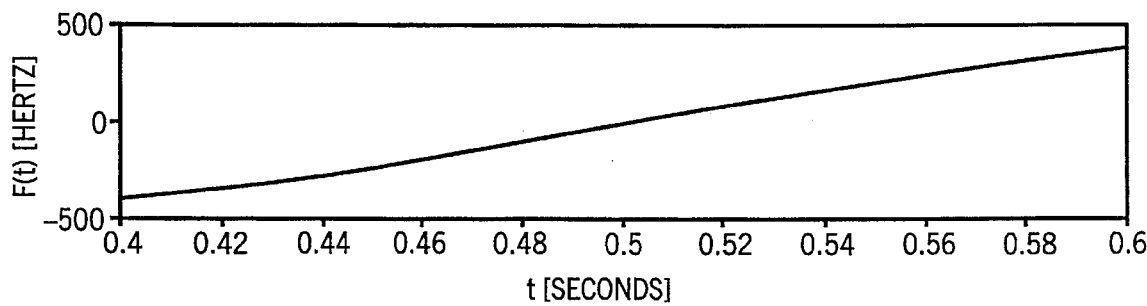
Figure 6:
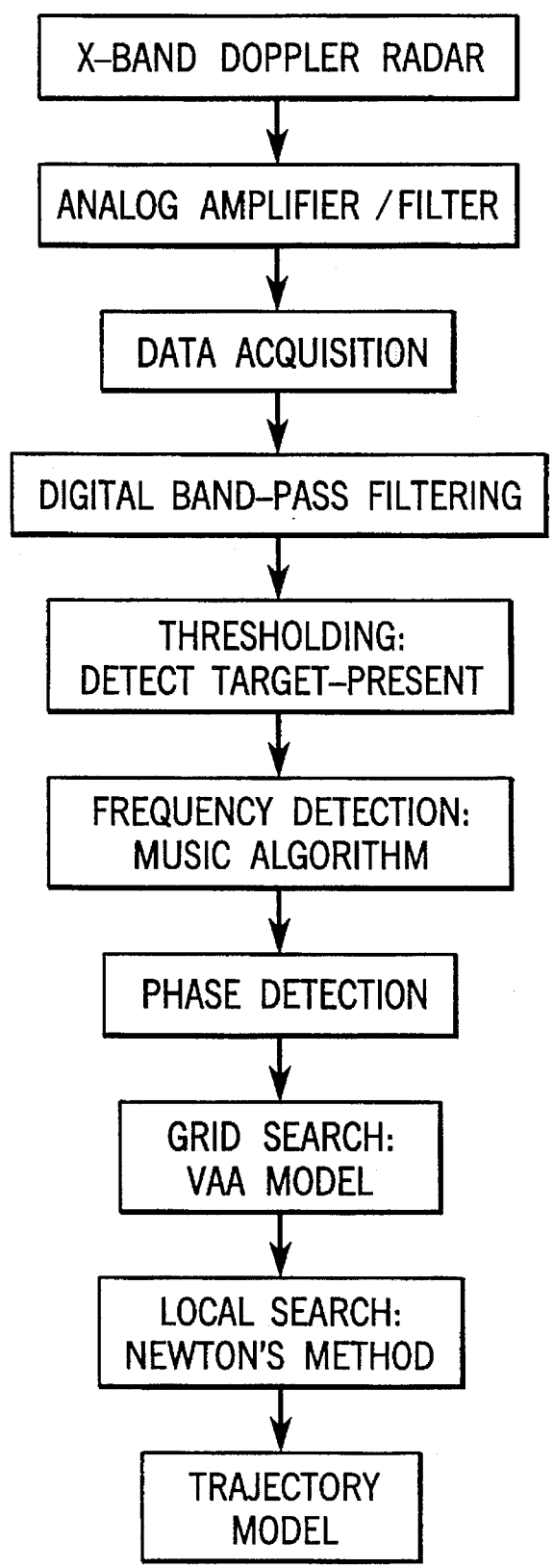
FIG. 6. Schematic of the trajectory detection signal analysis.

Doppler signal analysis starts with a moving target that is either radiating or reflecting a signal. The signal analysis steps for one possible embodiment of the invention are shown in FIG. 6. The X-band is one allowed by the FCC for unlicensed, low-power Doppler radars. Other frequencies, and indeed other forms of waves, such as sonar, could be used. Analog amplification and filtering are provided to match the radar output to computer data acquisition and to improve the signal to noise ratio. Once the signal is digitally acquired, digital filtering can be used to further enhance the signal to noise ratio.

Figure 7:
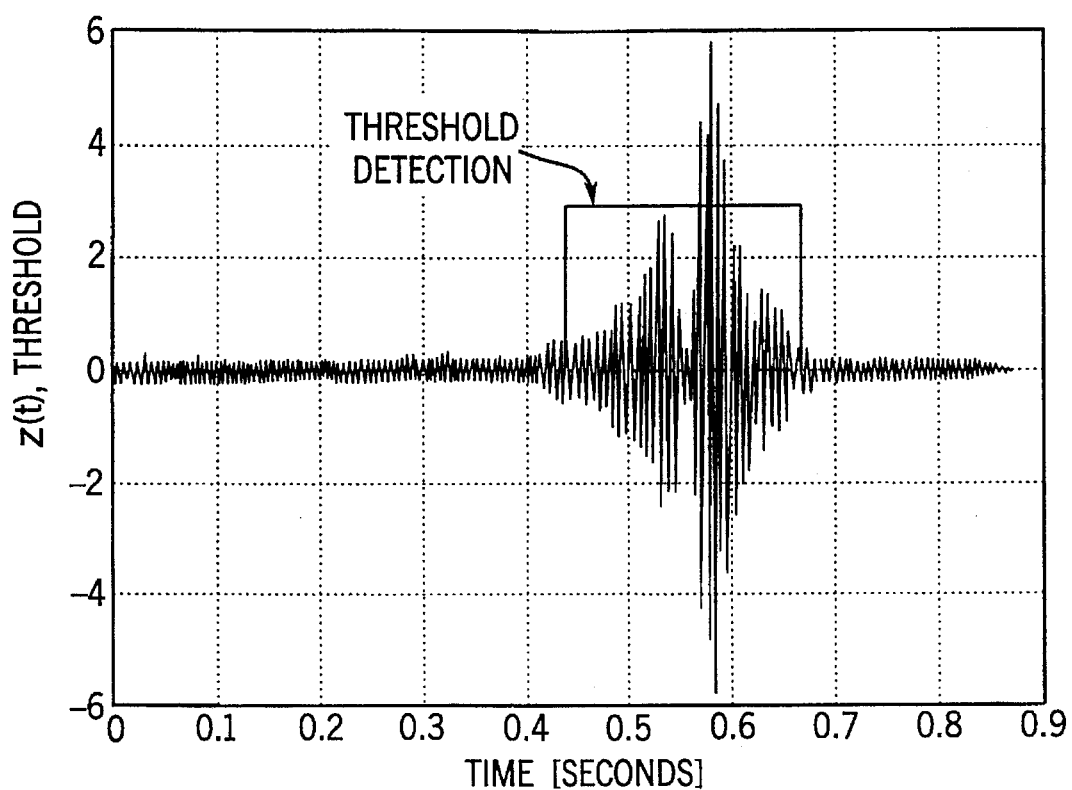
FIG. 7. Digitally sampled radar signal for a ball flight, $R_{pca}=1.05$ [m], $V_{pca}=11.0$ [m/s].

An actual data set, taken with a commercial Doppler radar tracking a baseball, is seen in FIG. 7. The period of large signal amplitude in FIG. 7 corresponds to the target passing near the radar. "Threshold Detection" in FIG. 6 refers to detecting the presence of a target in the radar signal by use of a band limited estimate of power, passed to a threshold detector. The output of this operation is seen in FIG. 7.

Figure 8:
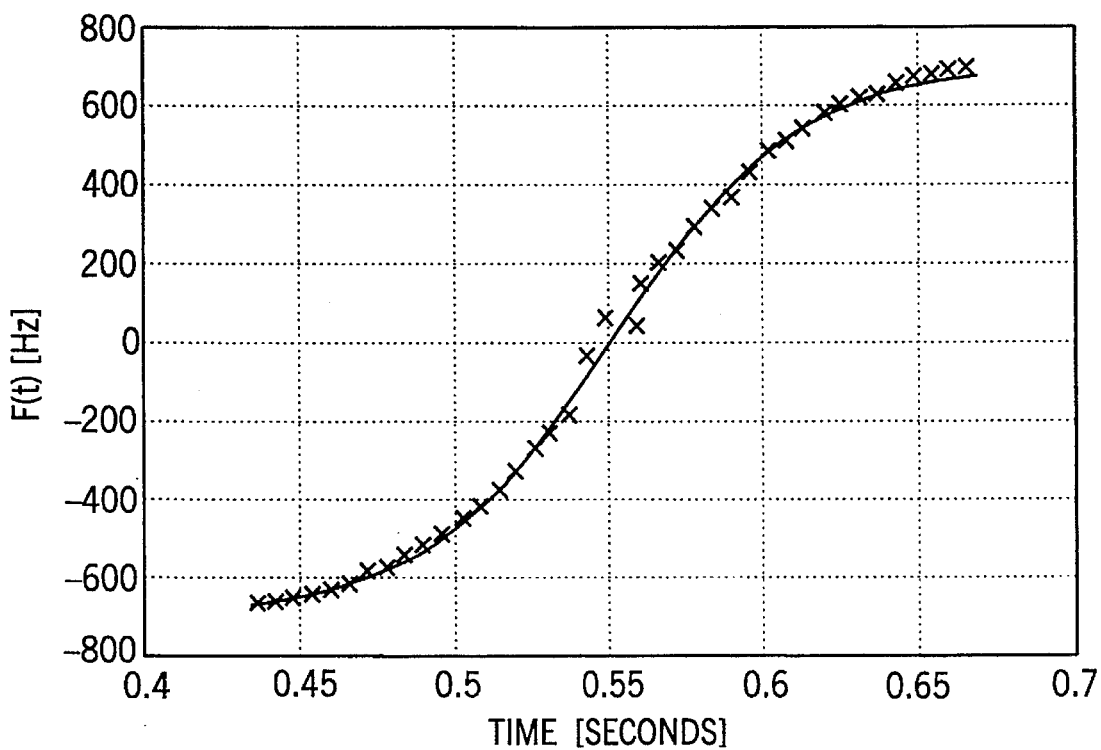
FIG. 8. Frequency data estimated by the music algorithm: 'x', and sigmoidal function fit to the data: '- - -'.

Because estimates of the instantaneous frequency are required to accurately detect the instantaneous phase of the Doppler signal, a frequency detection algorithm is applied to short data segments within the interval of interest. The MUSIC algorithm is suitable. Filtering can be used to improve the quality of the frequency estimate, such as a nonlinear optimization routine applied to fit a sigmoidal function to the estimated frequency values. This fitting process will provide a first, rough estimate of frequency as a function of time, as seen in FIG. 8.

Using a well known method of detecting the phase of the Doppler signal, sine and cosine functions are fit to a short data segment. From the instantaneous phase, the change in range can be computed. Defining the delta-range:

$$\Delta R_i(t) = R_i(t) - R_{pca}{}^i \qquad (6)$$

the delta-range at sensor i is given by:

$$\Delta R_i(t) = \frac{2}{\lambda} \left( \frac{ph(z_i(t)) - ph(z_i(t_{pca}^i))}{2\pi} + N_{cycles}^i(t) \right) \qquad (7)$$

where $N_{cycles}{}^i(t)$ is the number of whole cycles of phase rotation accumulated between $t_{pca}{}^i$ and t; $t_{pca}{}^i$ is the time of closest approach to sensor i, and $R_{pca}{}^i$ is the range at closest approach to sensor i.

Figure 9A:
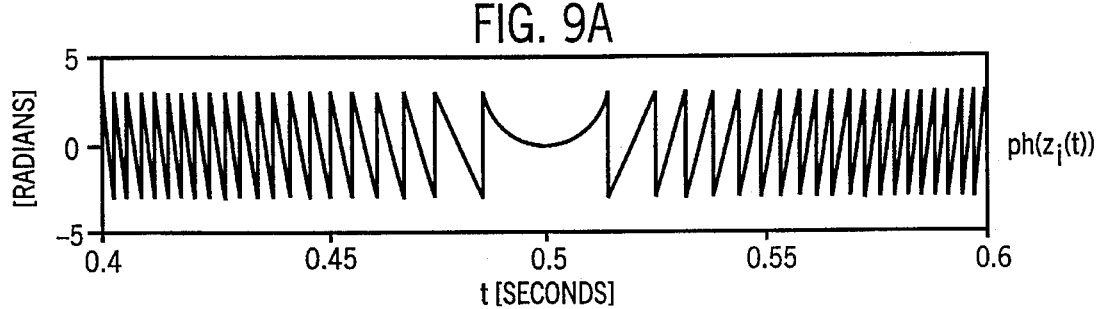
FIG. 9. (A) Phase detection using the signal of FIG. 4(B); (B) Counting cycles of phase rotation, (C) Accumulated phase rotation, which indicates the cumulative change in radial distance to the target.
Figure 9B:
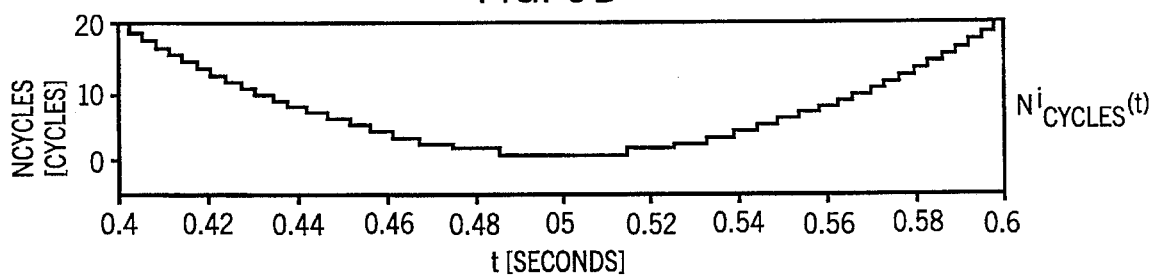
Figure 9C:
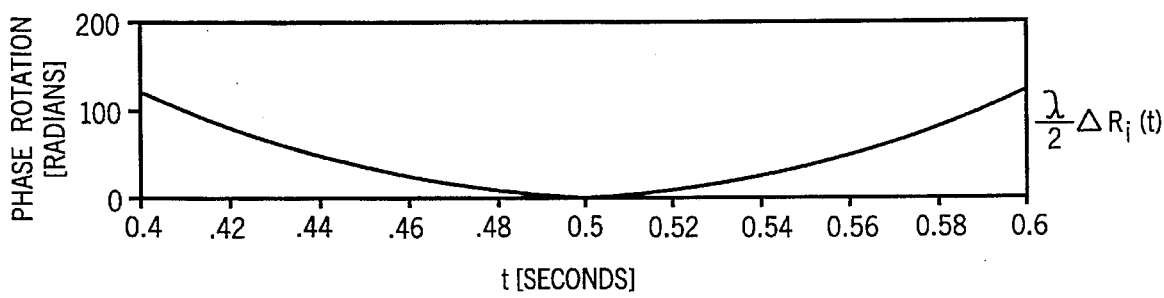

One possible method for detecting the cumulative phase rotation is illustrated in FIG. 9. The instantaneous phase of the detected signal, $ph(z_i(t))$, is shown in FIG. 9(A), where the range of phase from $-\pi$ to $\pi$ is seen. By counting the transitions from $-\pi$ to $\pi$, $N_{cycles}^i(t)$ can be determined, and is shown in FIG. 9(B). The accumulated phase rotation, $$2\pi \frac{\lambda}{2} \Delta R_i(t) = ph(z_i(t)) - ph(z_i(t_{pca}^i)) + 2\pi N_{cycles}^i(t) \quad (8)$$

is seen in FIG. 9(C).

Figure 10:
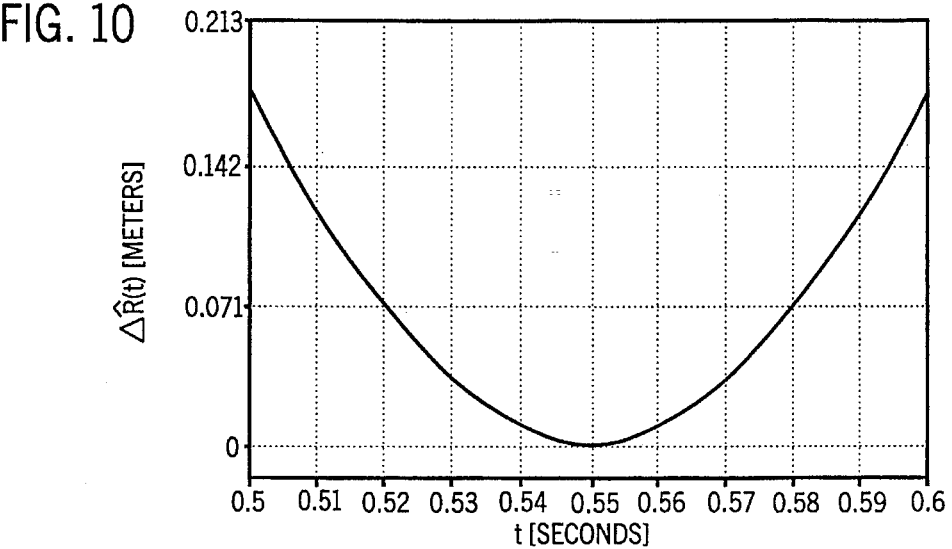
FIG. 10. $\Delta \hat{R}(t)$, the change in range between the target and radar, computed using Doppler signal phase angle. $\Delta \hat{R}(t)=0$ corresponds to the point of closest approach.

The delta-range, detected from accumulated phase rotation and given by equation (7), is related to the actual range by:

$$R_i(t) = \Delta R_i(t) + \frac{2}{\lambda}(n_i + ph(z_i(t^i pca^i)) - \theta_o) = \Delta R_i(t) + R_{pca}^i \quad (9)$$

where $n_i$ reflects the unknown integer number of cycles of phase rotation corresponding to the range of closest approach, and $\theta_o$, is the system phase delay, it is the phase angle detected when the target is an integer number of half wavelengths from the radar. In the identification process, $R_i(t)$ is constrained by the motion model, $\Delta \hat{R}_i(t)$ is estimated from the dam, and the $R_{pca}^i$ (one per sensor) are unknowns which are determined as part of fitting a consistent motion model to the $\Delta \hat{R}_i(t)$. An example of detected phase range is seen in FIG. 10.

To guide the model-based trajectory identification, a parametric model of possible trajectories is required. The constant acceleration trajectory model can accurately describe ballistic trajectories over moderate distances. It is specified by a nine element parameter vector:

$$\Phi = \begin{bmatrix} X_o \\ \dot{X}_o \\ \ddot{X}_o \end{bmatrix} \quad (10)$$

where $X_o$, $\dot{X}_o$, and $\ddot{X}_o$ are position, velocity and acceleration expressed in Cartesian coordinates at time $t_o$. The delta-range and frequency detected at each radar are given in terms of the trajectory parameters by equations (2), (3) and (9):

$$\Delta R_i(\Phi,t) = |X(\Phi,t) - Xs_i| - R_{pca}^i(\Phi) = g(\Phi,t) \quad (11)$$

$$F_i(\Phi,t) = \frac{2}{\lambda} \frac{\dot{X}(\Phi,t) \cdot (X(\Phi,t) - Xs_i)}{|(X(\Phi,t) - Xs_i)|} = h(\Phi,t) \quad (12)$$

where:

$$X(\Phi,t) = X_o + \dot{X}_o t + \frac{1}{2} \ddot{X}_o t^2 \quad (13)$$

$$\dot{X}(\Phi,t) = \dot{X}_o + \ddot{X}_o t$$

There is no closed-form inverse of the functions $g(\Phi, t)$ and $h(\Phi, t)$ which gives the parameter vector $\Phi$ in terms of the sensed phase data $\Delta \hat{R}_i(t)$ or frequency data $\hat{F}_i(t)$. Defining $\Phi^*$ to be the true parameter vector, and $\hat{\Phi}$ to be an estimate, the parameter misadjustment is given by:

$$\tilde{\Phi} = \Phi^* - \hat{\Phi} \quad (14)$$

and the model prediction error by:

$$\Delta \tilde{R}_i(\hat{\Phi},t) = \Delta \hat{R}_i(t) - \Delta R_i(\hat{\Phi},t) \quad (15)$$

The Least Squared Error (LSE) estimator is one of several available means for determining the trajectory model parameters, and can be formed as the nonlinear optimization problem of finding:

$$\hat{\Phi}^* = \min_{\hat{\Phi} \in R^9} (J(\hat{\Phi})) \quad (16)$$

where $$J(\hat{\Phi}) = (\Delta \hat{R}_i(t) - \Delta R_i(\hat{\Phi},t))^2 \quad (17)$$

defines the performance surface, and where $\hat{\Phi}^*$ is the LSE estimate of the trajectory parameter vector. Direct solution of (16) is rendered impractical by the dimensionality of $\Phi$ and the fact that the performance surface, $J(\hat{\Phi})$, shows local minima. However, if an estimate $\hat{\Phi}$ can be obtained which is sufficiently close to the true parameter vector, $\hat{\Phi}^*$, then the LSE estimate can be obtained from one or several iterations of Newton's method:

$$\hat{\Phi}_{\Delta R}^* = \hat{\Phi} + \frac{\partial \hat{\Phi}_{\Delta T}}{\partial \Delta R(\Phi,t)} \Delta \tilde{R} \quad (18)$$

where the partial derivative of the data with respect to the parameters is obtained by differentiating equation (11):

$$\frac{\partial \Delta R(\Phi,t)}{\partial \Phi} = \frac{\partial g(\Phi,t)}{\partial \Phi} \quad (19)$$

And the partial derivative of the parameters with respect to the data is obtained using the matrix pseudo inverse:

$$\frac{\partial \hat{\Phi}}{\partial \Delta R(\hat{\Phi},t)} = \left[ \left( \frac{\partial \Delta R(\hat{\Phi},t)}{\partial \hat{\Phi}} \right)^T \left( \frac{\partial \Delta R(\hat{\Phi},t)}{\partial \hat{\Phi}_{\Delta T}} \right) \right]^{-1} \left( \frac{\partial \Delta R(\hat{\Phi},t)}{\partial \hat{\Phi}} \right)^T \quad (20)$$

Equations (18) through (19) can likewise be written for estimation from observed frequency.

The signal analysis task of obtaining an initial trajectory parameter estimate sufficiently close to $\Phi^*$ that Newton's method will converge is a challenging one. A suitable method based on the velocity-acceleration-acceleration (VAA) trajectory model is presented here.

Figure 11:
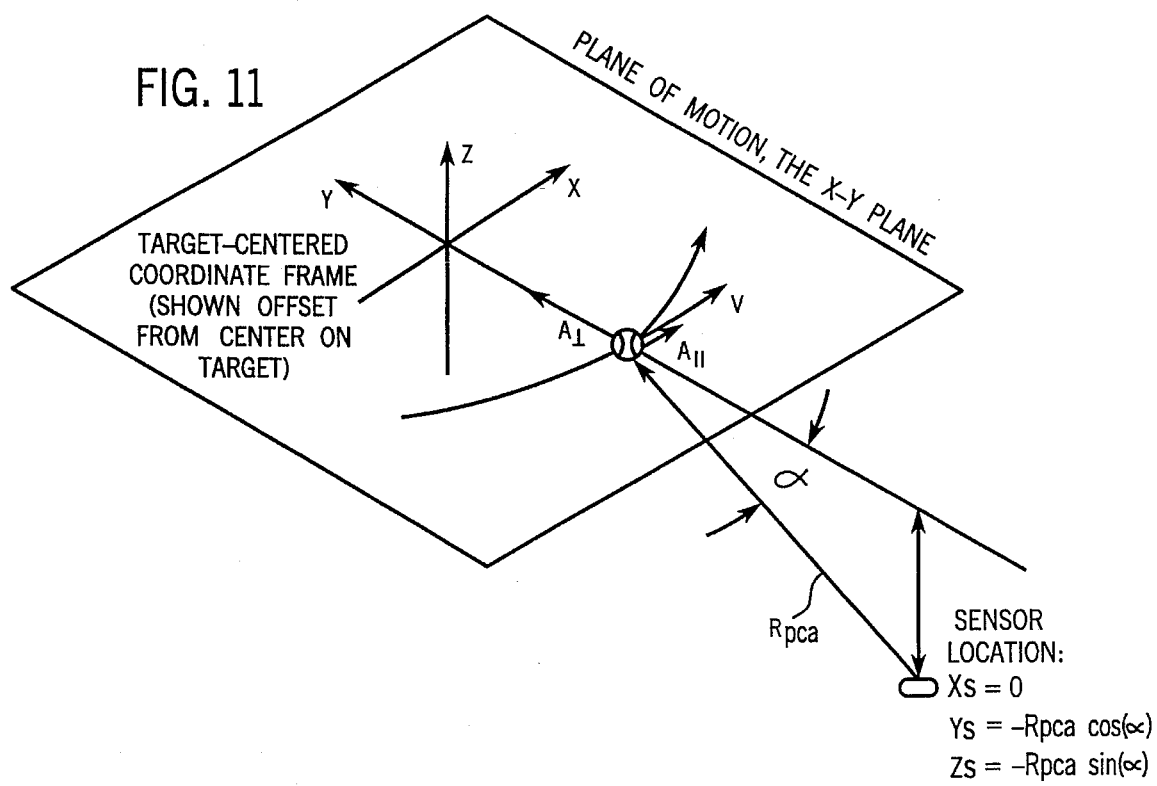
FIG. 11. Geometry of the Velocity+Parallel Acceleration+ Perpendicular Acceleration (VAA) model.

Within the antenna beam a single Doppler radar has spherical symmetry, and thus has 3 rotational degrees of freedom that are not identified, corresponding to elevation, azimuth and rotation about the line of sight. By correctly choosing the coordinate frame in which to express the motion, the general 9 parameter trajectory description can be reduced to a 6 parameter description of the motion observed by the radar. A motion representation which achieves the reduction to 6 parameters is the Velocity+Parallel Acceleration+Perpendicular Acceleration (VAA) model, seen in FIG. 11.

The VAA model exploits the fact that a general constant-acceleration motion lies in a single plane defined by the cross product of the velocity and acceleration vectors, $\dot{X} \times \ddot{X}$. In the VAA model, target motion occurs in the X - Y plane and the coordinate frame is centered on the target location at $t=t_{pca}$, with the X axis aligned with target velocity. The target trajectory is given by:

$$X_{VAA}(t) = \begin{bmatrix} 0 \\ 0 \\ 0 \end{bmatrix} + \begin{bmatrix} V \\ 0 \\ 0 \end{bmatrix} (t - t_{pca}) + \frac{1}{2} \begin{bmatrix} A_\parallel \\ A_\perp \\ 0 \end{bmatrix} (t - t_{pca})^2 \quad (21)$$

where $A_\parallel$ is the acceleration parallel to the velocity vector (and the X axis), and $A_\perp$ is the acceleration perpendicular to the velocity vector (and parallel to the Y axis). In the VAA model, the sensor location is given by:

$$X_{S_i} = \begin{bmatrix} 0 \\ -R^i_{pca} \cos(\alpha_i) \\ -R^i_{pca} \sin(\alpha_i) \end{bmatrix} \quad (22)$$

The 6 parameters of the VAA model are $V$, $A_\|$, $A_\perp$, $R_{pca}^i$, $t_{pca}^i$ and $\alpha_i$. Range is expressed in the VAA model by:

$$R_i^2(t) = (R^i_{pca})^2 + 2R^i_{pca}\Delta R_i(t) + \Delta R_i^2(t) = \quad (23)$$

$$(R^i_{pca})^2 + (V_i^2 + A_{i\perp} R^i_{pca} \cos(\alpha_i))\tau_i^2 + V_i A_{i\|}\tau_i^3 + \frac{A_{i\|}^2 + A_{i\perp}^2}{4} \tau_i^4$$

where $\tau_i = t - t_{pca}^i$ is time measured relative to the moment of closest approach. The $V_i$, $A_{i\|}$, and $A_{i\perp}$ are indexed on the sensor because $V(t)$ is different at each $t_{pca}^i$. As $V(t)$ changes, the orientation of the X and Y axes of the VAA model rotates. The $V_i$, $A_{i\|}$, and $A_{i\perp}$ are easily calculated from $V$, $A_\|$ and $A_\perp$ defined at a single instant $t_o$.

Any one of a number of methods of nonlinear optimization could be used to fit the VAA model parameters to the measured $\Delta \hat{R}_i(t)$ data. One approach is to fit the model to the data on a sensor by sensor basis. For N sensors, the identification yields 3N+3 parameters: $R_{pca}^i$, $t_{pca}^i$ and $\alpha_i$ for each sensor, and one set of $V$, $A_\|$, and $A_\perp$ evaluated at $t_o$. Of these parameters, the N values of $t_{pca}^i$ are independently identifiable from the data of FIGS. 8 and 10, and the $R_{pca}^i$ and $\{R_{pca}^i \cos(\alpha i)\}$ are linearly identifiable from equation (23). Thus, the techniques of nonlinear optimization need be applied in only the 3 dimensional space of $V$, $A_\|$, and $A_\perp$.

Values for $V$, $A_\|$ and $A_\perp$ which give a good fit to the measured $\Delta \hat{R}_i$ data can be found by searching in the space of possible velocities and parallel and perpendicular accelerations, this space comprising previously defined ranges of possible $V$, $A_\|$ and $A_\perp$. The goodness-of-fit at each point tested can be gauged by calculating the prediction error of equation (23).

For ballistic trajectories, the acceleration is dominated by air drag and gravity. When the acceleration due to air drag can be computed using an aerodynamic model of the target, the magnitudes of the parallel and perpendicular accelerations can be computed from velocity and the angle between the velocity vector and direction of gravity. The acceleration components are given by:

$$A_{Cd} = f(V)$$

$$A_\| = -A_{Cd} + A_g \cos(\theta_g) \quad (24)$$

$$A_\perp = A_g \sin(\theta_g)$$

where $A_{Cd}$ is the acceleration due to air drag and $f(V)$ is a function based on the aerodynamic model of the target; $A_g$ is the acceleration of gravity, and $\theta_g$ the angle between the velocity vector and direction of gravity.

The important aspect of the construction given in equation (24) is that unknown variables are $V$ and $\theta_g$; where as $V$, $A_\|$ and $A_\perp$ are the unknowns in the VAA model without knowledge of the aerodynamic drag. The dimensionality of the search can thus be reduced from 3 to 2, which results in a significant improvement in computational efficiency.

Once a good fit to the VAA model is obtained, a best-fit trajectory model in the 9 parameter Cartesian coordinate system, or any other, can be obtained using Newton's method and the calculated partial derivatives of the parameters, as shown with equation (18).

I claim:

1. A method of determining position, velocity, and acceleration of a moving target consisting of analyzing the phase angle of Doppler signals detected at three or more distinct points in space comprising:
   a. Representing the target motion in the velocity plus parallel acceleration plus perpendicular acceleration (VAA) model;
   b. Performing a search in the three dimensional space of possible velocities and parallel and perpendicular accelerations for the parameters which best fit the detected phase angles;
   c. Transforming the VAA model representation into a position, velocity, and acceleration model representation; and
   d. Determining the position, velocity, and acceleration of the moving target by optimizing the position velocity and acceleration model parameters to best fit the motion model to the detected phase angles.

2. A method of determining position, velocity, and acceleration of a moving target consisting of analyzing the phase angle of Doppler signals detected at three or more distinct points in space comprising:
   a. Representing the target motion in the velocity plus parallel acceleration plus perpendicular acceleration (VAA) model;
   b. Using an aerodynamic model of the target to express velocity plus parallel acceleration plus perpendicular acceleration in terms of the velocity and the angle and between the velocity vector and direction of gravity, and performing a search in the two-dimensional space of possible velocities and possible angles between the velocity vector and direction of gravity for the parameters which best fit the detected phase angles;
   c. Transforming the velocity and angle parameters into the VAA model parameters, and then transforming the VAA model representation into a position, velocity, and acceleration model representation; and
   d. Determining the position, velocity, and acceleration of the moving target by optimizing the position velocity and acceleration model parameters to best fit the motion model to the detected phase angles.

3. A device for determining the position, velocity, and acceleration of a moving target consisting of:
   a. three (3) or more Doppler radars comprising a transmitter, a receiver, and homodyne detector;
   b. a data acquisition system for converting the Doppler signals generated by the Doppler radars into a digital format;
   c. a computing machine for analyzing the phase angle of the Doppler signals; and,
   d. software for analyzing the phase angle for the Doppler signals and determining the position, velocity, and acceleration for the moving target whereby said software further comprising a method for establishing an initial estimate of the target motion parameters; said method employing a search of the space of possible VAA model parameters.

\* \* \* \* \*